Patented May 11, 1926.

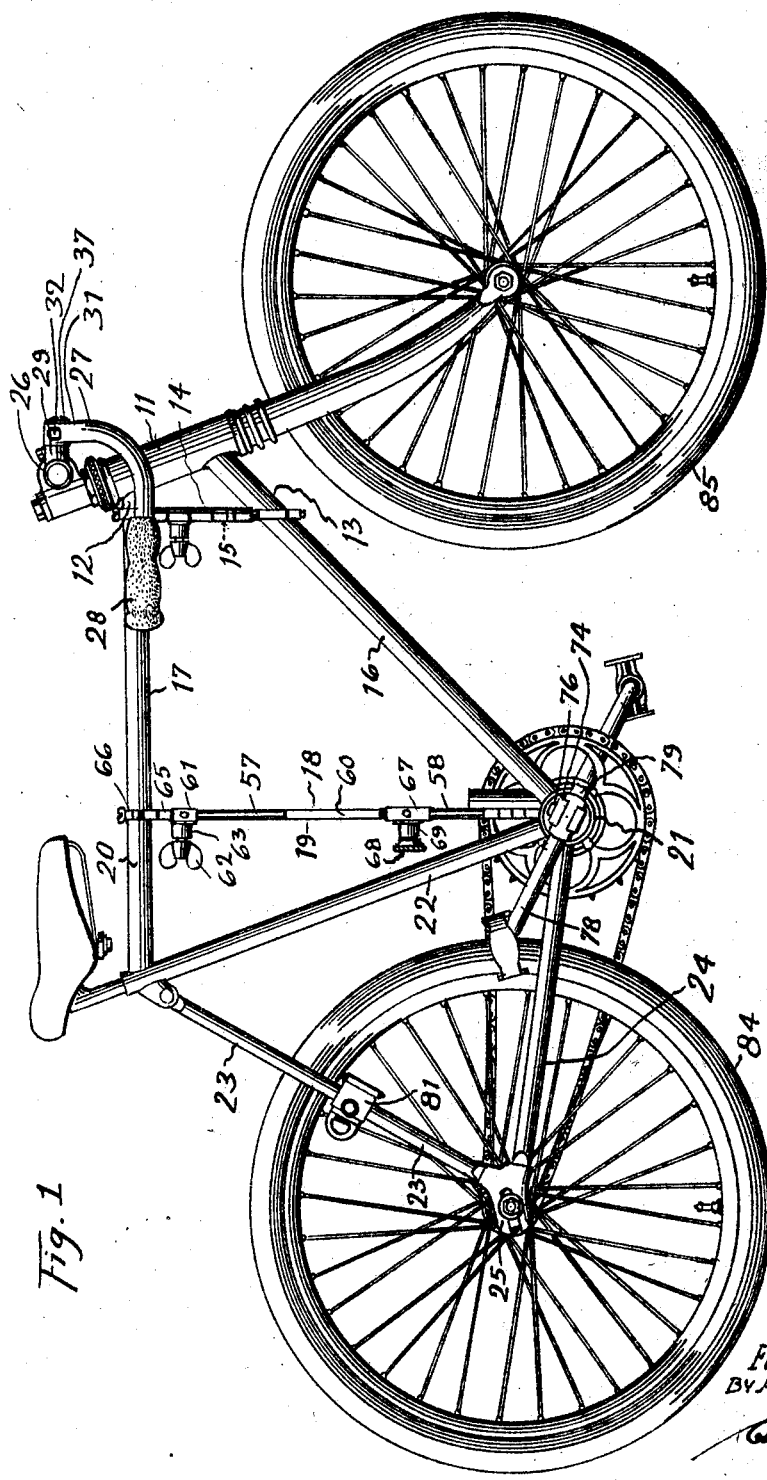

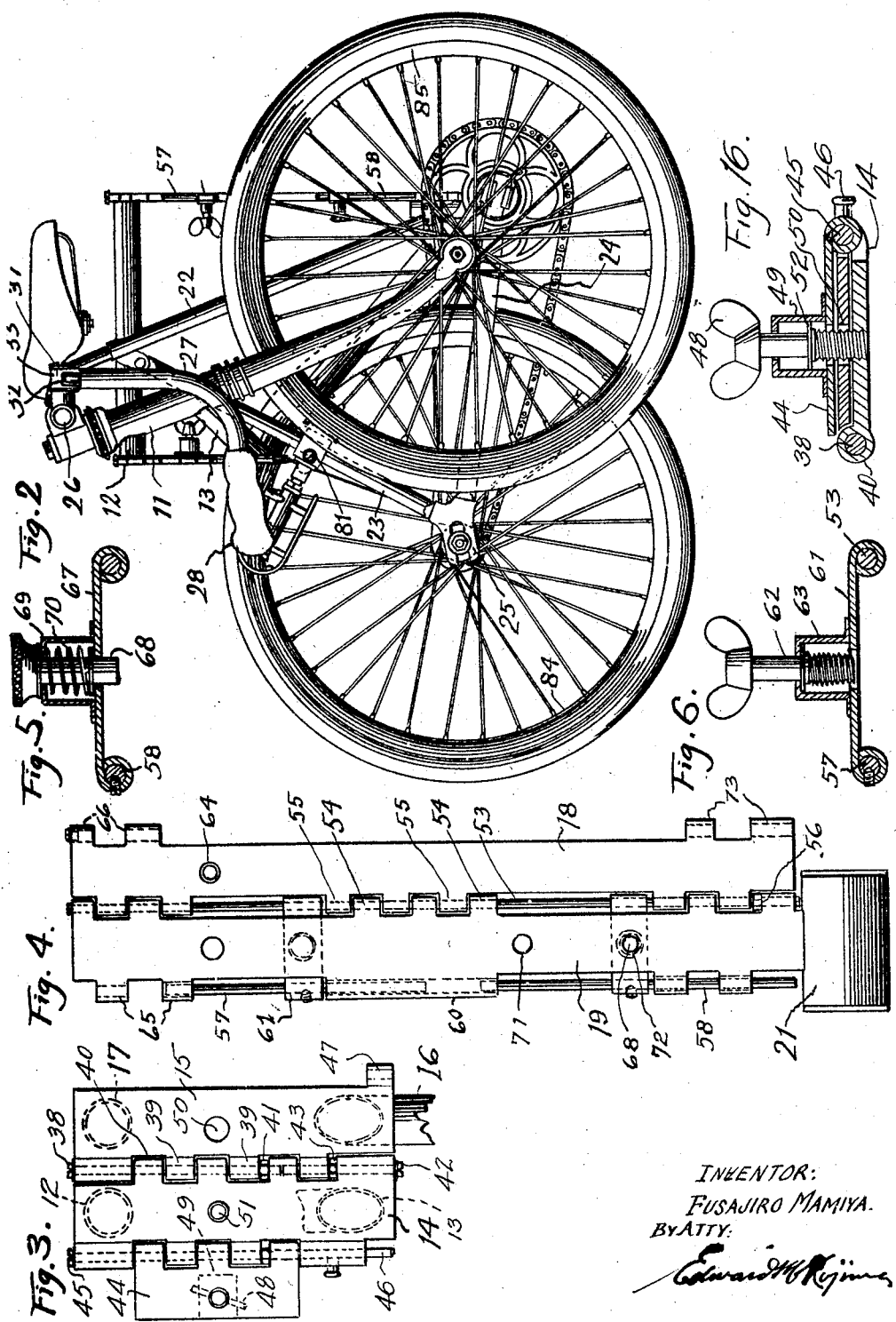

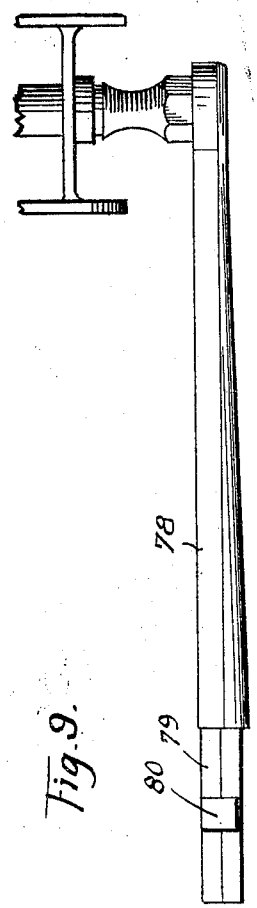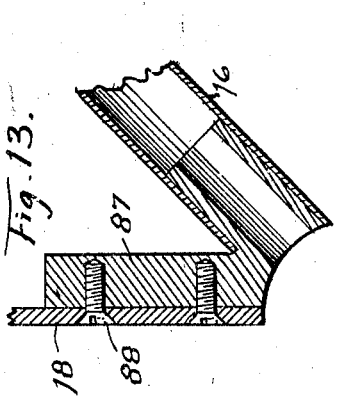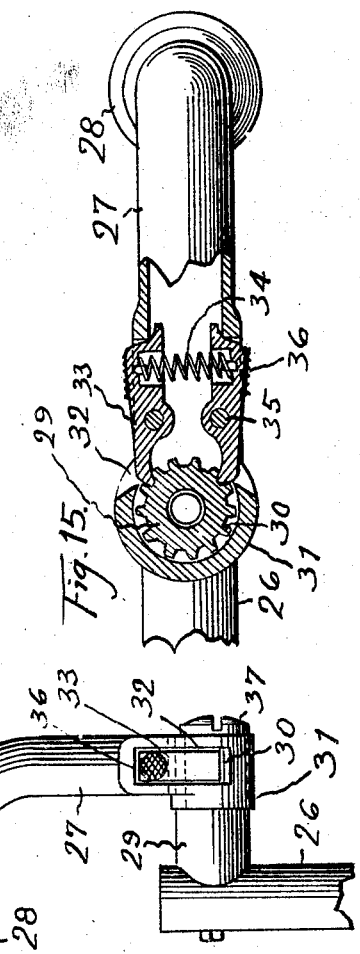

1,584,314

UNITED STATES PATENT OFFICE.

FUSAJIRO MAMIYA, OF LOS ANGELES, CALIFORNIA.

FOLDING BICYCLE.

Application filed August 14, 1924. Serial No. 731,993.

The present invention has relation to an improved folding bicycle, and its objects are to provide a foldable and collapsible device of this character, for convenience in packing, or for parking the bicycle, and for locking the same to protect against theft.

Another object is to provide improved means for the adjustment of the handles to suit the rider of the bicycle, and whereby the handles may be more readily placed in a relatively collapsed position.

In the drawings: Figure 1 is a side elevation of a bicycle embodying the present invention. Fig. 2 is a side elevation of the bicycle in its collapsed or folded position. Fig. 3 is a fragmentary detail view showing the forward folding elements in open or extended position. Fig. 4 is a fragmentary detail view showing the rear folding elements in open or extended position. Fig. 5 is a sectional detail view of a spring-actuated locking element. Fig. 6 is a sectional detail view of the rear locking element having a wing locking nut. Fig. 7 is an end view of the pedal axle showing the support for the detachable pedal. Fig. 8 is a sectional detail view of the support for the detachable pedal. Fig. 9 is a plan and detail view of the detachable pedal. Fig. 10 is a top plan view of the locking element for securing the pedal when detached from the pedal axle. Fig. 11 is a side view of the locking element for securing the pedal in its detached position. Fig. 12 is a fragmentary and sectional view of the bicycle frame showing a folding element affixed to the pedal axle housing. Fig. 13 is a fragmentary and sectional view of the bicycle frame showing the forward portion of the frame affixed to a folding element. Fig. 14 is a top plan and fragmentary view of the handle bar. Fig. 15 is a sectional detail view showing the collapsing elements for the handle bar. Fig. 16 is a sectional view showing the forward hinge elements in their locked position.

Referring to the drawings, the front portion of my improved collapsible bicycle frame consists of the front frame member 11, the horizontal brace 12, the bottom brace bar 13, and the hinge member 14. The central portion of the bicycle frame includes the hinge member 15, the bottom inclined brace bar 16, the horizontal brace bar 17, and hinge member 18. The rear portion of the bicycle frame includes the rear hinge member 19, the horizontal brace 20, the pedal axle housing 21, the inclined brace member 22, inclined rear fork members 23, horizontal rear fork members 24, and rear axle supports 25. The collapsible handle bars include the central portion 26, and the adjustable members 27, provided with handles 28. Referring in detail to the handle bars, the central portion 26, is provided with integral and angularly projecting ends 29, each having a toothed extremity 30. Each adjustable member 27 is provided with an eye end 31, adapted to encircle a corresponding toothed extremity 30, and is provided with a slot 32, in which are mounted two opposed pawls 33, adapted to engage with the extremity 30, and actuated by a spring 34, which serves to maintain them in their operative engagement to hold the handle bar in its adjusted position. The pawls are mounted on fixed pivot pins 35, and are released from their operative engagement by depressing the cam ends 36. Each handle bar member 27 is retained in position by a screw member 37 in engagement with a corresponding extremity 30.

Referring in detail to the front hinge members, the members 14 and 15, are pivotally connected by a pintle member 38, extending through knuckles 39 and 40, and secured by a nut 41, and by a shorter pintle member 42, secured by a nut 43. A clasp element 44, is pivotally connected by a pintle member 45, with member 14. In the closed position of the hinge members, a pintle member 46, slidably mounted in member 14, engages with a knuckle 47, integral with hinge member 15. A screw clamp member 48, mounted in the housing 49, is adapted to extend through the hole 50 in member 15, and to engage with a corresponding threaded hole 51, in hinge member 14. A flange 52, retains the clamp member 48 in housing 49, when disengaged from member 14.

Referring in detail to the rear hinge members, the members 18 and 19 are connected by a pintle member 53, extending through the several hinge knuckles 54 and 55, and secured by a nut 56, interposed between the lowermost pair of knuckles. On the opposite side of hinge member 19, the upper pintle member 57 and lower pintle member 58 are slidably mounted in the several hinge knuckles 60. A slide member 61, adjacent to the top, is fixed to the upper slidable pivot member 57, and slides upon pintle member 53. The slide member 61 is fixed to member 57, that is, it is secured thereto. The said members may be brazed together, or pinned together, or the pivot member may be knurled and driven into the slide member 61. The drawing shows the pintle member 57, fixed to the knuckle part 9, of slide member 61. Slide member 61 is provided with a clamp screw 62, mounted in housing 63, and adapted to engage with a threaded hole 64, in hinge member 18. When the frame elements are in their open position, the upper slidable pintle member 57, will extend through knuckle members 65 and 66, at the top of the hinge members. When the clamp screw is turned inwardly the threaded portion thereof will engage with the threaded hole 64 in member 18, thereby locking the hinge elements together. The lowermost slidable pintle member 58 is fixed to a slide member 67, which is slidably mounted on pintle member 53. The pintle member 58 is fixed to slide member 67, being secured to the knuckle part 8, of member 67. Slide member 67 is provided with a plunger 68, mounted in housing 69 and actuated by a spring 70. In collapsed position of the parts, the plunger extends in hole 71, and retains the pintle member 58 in inoperative position. For clearness of illustration, the slide member 67 and pintle member 58 are shown in their lower or operative position. In the open position of the frame elements, the plunger 68 extends in hole 72, and thereby retains the pintle member 58 in operative position and in engagement with knuckles 73.

The pedal axle is provided on one end with a housing 74, having a half-round hole 75. A plunger 76, mounted in the housing 74, extends in opening 75, and is actuated by a spring 77. The detachable pedal member 78, is provided with its inner extremity 79, formed to correspond with the opening 75, and, when inserted therein, the plunger 76, engages with a groove 80, to retain the pedal in its operative position. To release the pedal, the plunger is depressed, whereupon the pedal may be withdrawn.

A lock member 81, is mounted on some portion of the bicycle frame, which may be the frame members 23 as shown, and is provided with a hole 82, corresponding to the pedal end 79, and with a locking bar 83, adapted to engage with groove 80, when the pedal is inserted in the lock member. The lock member may be so arranged that when the pedal is inserted, the wheel 84 will be locked against rotation, or to engage with the front wheel 85.

To provide a strong frame, the hinge member 19, has a curved lower extremity 86, extending within the pedal axle housing 21, and brazed thereto. The hinge member 18 is provided with a reinforcing element 87, secured by screws 88, and brazed thereto, and to which the frame member 16 is brazed or otherwise secured.

In the collapsed position of the bicycle, the frame elements are folded as shown, and the handle bars are adjusted to their lowermost position which serves to prevent the frame from moving from its collapsed position. When the frame elements are moved to their relative open position, and the clamp screws are operated to bind the hinge parts together, the bicycle is rigid similarly to an ordinary bicycle. In open position, the detached pedal may be left in its lock member, and thus serves to protect against theft.

I claim:

1. In a folding bicycle, the combination with an articulate frame including a forward, a central, and a rear section, of co-acting hinge elements forming the end portions of each section, a pintle member connecting the hinge elements on one side thereof, knuckle members on the opposite side of the hinge elements, sliding bolt members mounted in the said knuckle members, slides fixedly connected to the sliding bolt members, and locking elements for securing the slides and sliding bolts in operative position to lock the hinge elements together in the open position of the frame members.

2. In a folding bicycle, the combination with an articulate frame including a forward and a central section, of co-acting hinge elements forming contiguous end portions of said sections, hinge knuckles forming the edges of said hinge elements, pintle elements extending through the knuckles on one side of said hinge elements, a hinge leaf connected to the opposite side of the forward section hinge element, said leaf being adapted to fold upon the central hinge section, and a screw-threaded clamp mounted on the leaf element, and adapted to extend through said central hinge section, and to engage with said forward hinge section in the open position of the frame sections, and a sliding bolt element mounted in other hinge knuckles and connecting the hinge elements in the open position of the frame sections.

3. In a folding bicycle, the combination with an articulate frame including a central section and a rear section, said sections being foldable one upon the other, of co-acting hinge elements forming contiguous end portions of said sections, a plurality of hinge knuckles arranged upon contiguous edges of the hinge elements, a single pintle member connecting the hinge elements on one side thereof and extending through the knuckles on one side thereof, an upper bolt member adapted to slide through certain of the knuckles on the opposite side of the hinge members, a lower bolt member adapted to slide through certain other knuckles, a slide fixedly connected to the lower bolt member, a housing mounted on the slide, a spring-actuated plunger mounted in the housing and adapted to extend through a hole in one of the hinge elements to lock the bolt in operative position, a slide element fixedly connected to the upper bolt member, a housing mounted on the upper slide element, and a threaded bolt clamp member mounted in the last-named housing and adapted to engage with a correspondingly threaded hole in the hinge element forming a portion of the central frame section.

In testimony whereof, I hereunto affix my signature.

FUSAJIRO MAMIYA.